(12) United States Patent
Murayama (10) Patent No.: US 8,290,388 B2
(45) Date of Patent: Oct. 16, 2012

(54) IMAGE FORMING APPARATUS HAVING AN OPTICAL SENSOR

(75) Inventor: Kentaro Murayama, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 410 days.

(21) Appl. No.: 12/724,805

(22) Filed: Mar. 16, 2010

(65) Prior Publication Data

US 2010/0272462 A1 Oct. 28, 2010

(30) Foreign Application Priority Data

Apr. 27, 2009 (JP) ................................ 2009-108141

(51) Int. Cl.
*G03G 15/00* (2006.01)
(52) U.S. Cl. ... 399/74; 399/31; 250/559.06; 250/559.39
(58) Field of Classification Search ............... 399/31, 399/74
See application file for complete search history.

(56) References Cited

U.S. PATENT DOCUMENTS

| 4,670,647 | A | * | 6/1987 | Hubble et al. | ......... | 250/214 AG |
| 5,499,079 | A | * | 3/1996 | Kinoshita et al. | ............... | 399/46 |
| 2005/0023444 | A1 | * | 2/2005 | Sander | ....................... | 250/214 C |
| 2006/0016959 | A1 | * | 1/2006 | Nishimura | .................... | 250/205 |
| 2008/0124114 | A1 | | 5/2008 | Yamagata et al. | | |

FOREIGN PATENT DOCUMENTS

| JP | 2005-091591 A | 4/2005 |
| JP | 2008-134333 | 6/2008 |
| JP | 2008-233369 A | 10/2008 |

OTHER PUBLICATIONS

JP Notification of Reasons for Refusal dated Feb. 7, 2012, corresponding Application No. 2009-108141; English Translation.
JP Office Action dtd Apr. 26, 2011, JP Appln. 2009-108141, English translation.

* cited by examiner

*Primary Examiner* — Walter L Lindsay, Jr.
*Assistant Examiner* — Benjamin Schmitt
(74) *Attorney, Agent, or Firm* — Banner & Witcoff, Ltd.

(57) ABSTRACT

An image forming apparatus includes a sensor having a light emitting section for irradiating a detection area and a light receiving section for outputting a light sensitive signal indicative of the amount of the light received from the detection area. A sensor adjustment section adjusts the sensitivity of the sensor by varying the set value of an adjustable characteristic value associated with the sensitivity, based on explorative measurement of the adjustable characteristic value corresponding to a predetermined reference level of the light sensitive signal. If an estimation section estimates that the amount of a leakage current generated on the light receiving section is larger than a reference amount, a mitigation section mitigates the influence of the leakage current on the explorative measurement, by at least one of adjustment of the light receiving section for reduction of the leakage current and modification of the predetermined reference level.

20 Claims, 8 Drawing Sheets

IMAGE FORMING APPARATUS HAVING AN OPTICAL SENSOR

CROSS REFERENCE TO RELATED APPLICATION

The present application claims priority from Japanese Patent Application No. 2009-108141 filed on Apr. 27, 2009. The entire content of this priority application is incorporated herein by reference.

TECHNICAL FIELD

The present disclosure relates to an image forming apparatus that includes a sensor having a light emitting section and a light receiving section.

BACKGROUND

An image forming apparatus having a plurality of image forming units is conventionally provided, in which toner images are sequentially transferred from the image forming units arranged along a paper conveyor belt to paper on the belt. In this type of image forming apparatus, the misalignment of images transferred from the respective image forming units (i.e., a color shift) can be prevented by the technique called Registration, and further image density errors in the toner images can be prevented by the technique called Image Density Correction.

The image forming apparatus includes an optical sensor having a light emitting section and a light receiving section, which is to be used by the above techniques. The light emitting section irradiates the belt with light, while the light receiving section receives the light reflected from the belt and outputs a light sensitive signal indicative of the amount of the received light. Marks to be used for Registration or Image Density Correction are formed on the belt using the image forming units. The positions or image densities of the marks are measured based on the light sensitive signal from the light receiving section, taking advantage of the difference in reflectivity (or in amount of reflected light) between the bare belt surface and mark-formed areas. The errors in positions or densities of images to be transferred are corrected based on the result of the above measurement.

However, the reflectivity of the bare belt surface may vary with long-term use, which can lead to accuracy deterioration in measurement of the positions and image densities of the marks. In view of this, it has been proposed that the level of the light sensitive signal when the light receiving section receives the light reflected from the belt surface be adjusted to a target level by a sensor adjustment process.

In the case that a leakage current is generated on the light receiving section due to manufacturing variations of the light receiving section and/or change in surrounding environment, the light sensitive signal outputted by the light receiving section may show the influence of the leakage current, and therefore indicate a certain level even when the reflected light is not applied to the light receiving section. In this case, the sensor adjustment process may fail to adequately achieve the above adjustment.

Thus, there is a need in the art to provide an image forming apparatus in which the adjustment of the sensitivity of a sensor can be adequately achieved while the influence of a leakage current on the adjustment is suppressed.

SUMMARY

An image forming apparatus according to an aspect of the invention includes a sensor used to detect a state of an object present in a detection area. The sensor has a light emitting section and a light receiving section. The light emitting section irradiates the detection area with light. The light receiving section receives the light from the detection area, and outputs a light sensitive signal indicative of the amount of the received light. The image forming apparatus further includes a sensor adjustment section, an estimation section and a mitigation section.

The sensor adjustment section is configured to adjust the sensitivity of the sensor to a target level by varying the set value of an adjustable characteristic value associated with the sensitivity. The set value of the adjustable characteristic value is adjusted to achieve the target level of the sensitivity, based on explorative measurement of the adjustable characteristic value corresponding to a predetermined reference level of the light sensitive signal. The explorative measurement is performed while the detection area is in a predetermined state.

The estimation section is configured to obtain a measurement value associated with the amount of a leakage current generated on the light receiving section and to estimate based on the measurement value whether the amount of the leakage current is larger than a reference amount. The mitigation section is configured to mitigate the influence of the leakage current on the above explorative measurement, by at least one of adjustment of the light receiving section for reduction of the leakage current and modification of the predetermined reference level, if the estimation section estimates that the amount of the leakage current is larger than the reference amount.

BRIEF DESCRIPTION OF THE DRAWINGS

Illustrative aspects in accordance with the present invention will be described in detail with reference to the following drawings wherein.

DETAILED DESCRIPTION

An illustrative aspect of the present invention will be hereinafter explained with reference to the drawings.

(General Construction of Printer)

Figure 1:
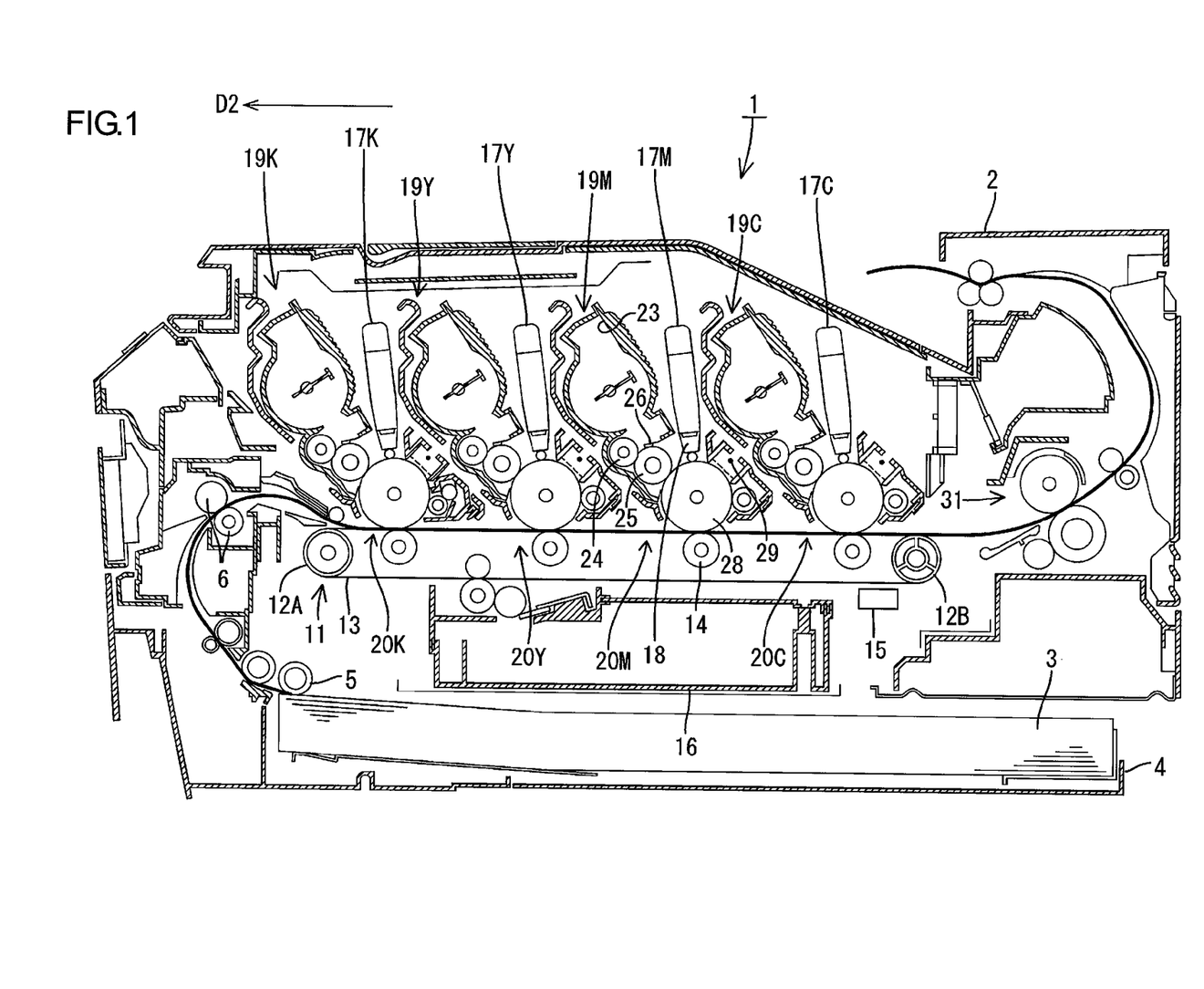
FIG. 1 is a side sectional view showing the general construction of a printer according to an illustrative aspect of the present invention.

FIG. 1 is a side sectional view showing the general construction of a printer 1 according to the present aspect, which is an example of "an image forming apparatus" of the present invention. The printer 1 is a color printer of a direct-transfer type, which can form a color image using toner of four colors (i.e., black, cyan, magenta and yellow), for example.

Hereinafter, the left side of FIG. 1 is referred to as the front side of the printer 1. The front-back direction of the printer 1 corresponds to a secondary scanning direction, while the right-left direction of the printer 1 corresponds to a main scanning direction. The secondary scanning direction is shown by an arrow and the symbol "D2" in FIGS. 1 and 4. When the components of the printer 1 or the related terms should be distinguishably described in association with the respective colors, the suffixes K (Black), C (Cyan), M (Magenta) and Y (Yellow) for indicating colors are attached to symbols of the components or the terms.

The printer 1 has a casing 2, and a tray 4 is provided on the bottom of the casing 2. A plurality of sheets 3 (or specifically, paper) can be stacked on the tray 4. A pickup roller 5 is provided above the front end of the tray 4, and thereby the top one of the sheets 3 on the tray 4 can be forwarded to registration rollers 6. The registration rollers 6 forward the sheet 3 (as a recording medium) to a belt unit 11. If the sheet 3 is obliquely directed, it is corrected by the registration rollers 6 before forwarded to the belt unit 11.

The belt unit 11 includes a ring belt 13, which is stretched between a pair of support rollers 12A and 12B. The belt 13 is made of a resin material such as polycarbonate, and has a mirrored outer surface. While the posterior support roller 12B is rotated, the belt 13 is cyclically moved so as to convey the sheet 3 (on the face of the belt 13) backward. Four transfer rollers 14 are provided on the inner side of the belt 13, and are located across the belt 13 from respective photoconductors 28 (i.e., components of respective processing units 19K to 19C described below).

A mark sensor 15 (i.e., an example of a sensor of the present invention) is provided below the belt 13, so as to face the downward-facing surface of the belt 13. The mark sensor 15 is mainly used to detect a detection pattern DP formed on the belt 13 for measurement of color registration errors, as described below. The details of the mark sensor 15 will be explained later. Further, a cleaning unit 16 is provided below the belt unit 11, in order to collect toner, paper dust and the like, which can become attached to the face of the belt 13.

The printer 1 includes four image forming sections 20K, 20Y, 20M, 20C provided for four respective colors (i.e., black, cyan, magenta and yellow). Each image forming section 20K, 20Y, 20M, 20C includes an exposure unit 17K, 17Y, 17M, 17C, a processing unit 19K, 19Y, 19M, 19C and the transfer roller 14 described above. The four exposure units 17K to 17C and the four processing units 19K to 19C are located above the belt unit 11, and are arranged in the front-back direction.

Each of the exposure units 17K to 17C has an LED head 18 at the bottom, which includes a plurality of LEDs arranged in a line. The exposure units 17K to 17C can individually perform line-by-line scan by emitting light from the LED head 18 to the surface of the corresponding photoconductor 28. At the time, the light emission by the exposure units 17K to 17C is controlled based on image data of respective colors, while being corrected in the secondary scanning direction D2 based on correction values stored in the NVRAM 43, as described below.

Each of the processing units 19K to 19C includes a toner container 23, a supply roller 24, a developer roller 25 and a layer thickness controlling blade 26. The toner container 23 can contain toner (or developer). The toner is supplied from the toner container 23 to the developer roller 25 by rotation of the supply roller 24. At the time, the toner is positively charged between the supply roller 24 and the developer roller 25 by friction. The toner on the developer roller 25 enters between the layer thickness controlling blade 26 and the developer roller 25 by rotation of the developer roller 25. Thereby, the toner is held as a thin layer of a uniform thickness on the developer roller 25, and is further sufficiently charged by friction.

In a lower section of the processing unit 19K to 19C, the photoconductor 28 is provided with a scorotron charger 29. The surface of the photoconductor 28 is covered with a positively-electrifiable photosensitive layer. During image formation, the surface of the photoconductor 28 is charged positively and homogeneously by the charger 29 while the photoconductor 28 is rotated. The positively-charged area of the photoconductor 28 is exposed to the scanning light from the exposure unit 17K to 17C, and thereby an electrostatic latent image (corresponding to an image of the color to be formed on the sheet 3) is formed on the surface of the photoconductor 28.

Next, the positively-charged toner on the developer roller 25 is supplied to the surface of the photoconductor 28 so as to adhere to the electrostatic latent image. Thus, the electrostatic latent image of each color is visualized as a toner image of the color on the photoconductor 28. While the sheet 3 (being conveyed by the belt 13) passes between each photoconductor 28 and the corresponding transfer roller 14, a negative transfer voltage is applied to the transfer roller 14. Thereby, the toner images on the respective photoconductors 28 are sequentially transferred to the sheet 3, which is then forwarded to a fixation unit 31. The resultant toner image is thermally fixed to the sheet 3 by the fixation unit 31. Thereafter, the sheet 3 is transferred upward, and is ejected onto the upper surface of the casing 2.

(Electrical Configuration of Printer)

Figure 2:
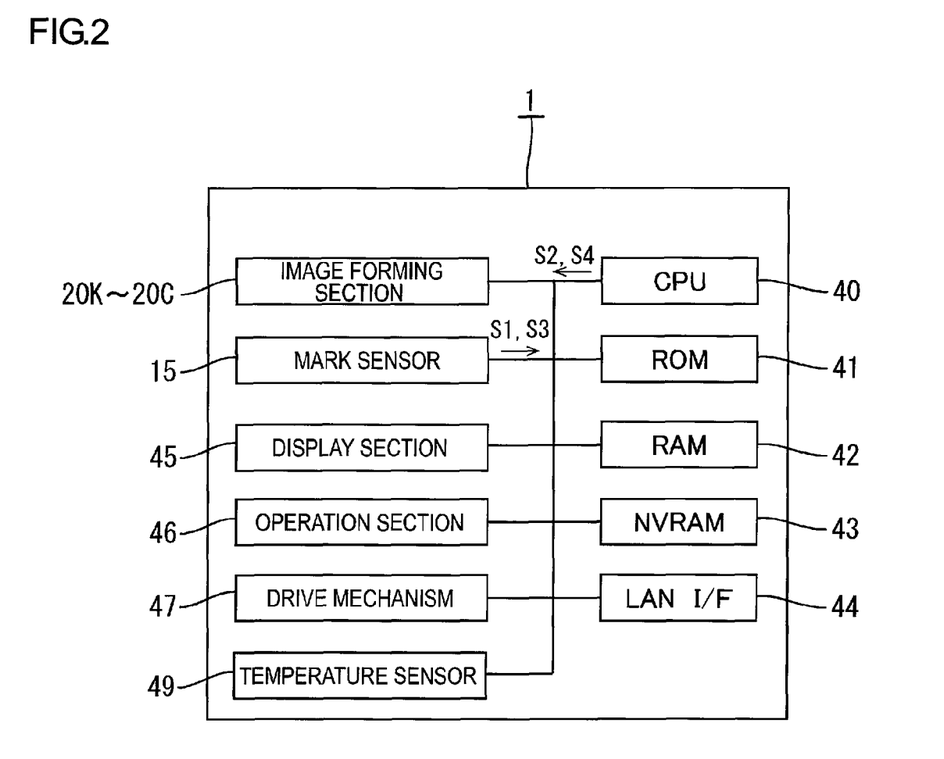
FIG. 2 is a block diagram schematically showing the electrical configuration of the printer.

FIG. 2 is a block diagram schematically showing the electrical configuration of the printer 1. Referring to the figure, the printer 1 includes a CPU 40, a ROM 41, a RAM 42, an NVRAM (nonvolatile memory) 43 and a network interface 44. The above-described image forming sections 20K to 20C and the mark sensor 15 are connected to these components. The printer 1 further includes a display section 45, an operation section 46, a drive mechanism 47 and a temperature sensor 49, which are also connected to the above components.

Various programs for controlling the operation of the printer 1 are stored in the ROM 41. The CPU 40 controls the operation of the printer 1 based on the programs retrieved from the ROM 41, while storing the processing results in the RAM 42 or the NVRAM 43. The network interface 44 is connected to an external computer (not shown) or the like, via a communication line, in order to enable mutual data communication.

The programs stored in the ROM 41 include programs for a registration error correction process, a sensor sensitivity adjustment process and a low-reference adjustment process, which can be executed by the CPU 40 (i.e., an example of "a sensor adjustment section", "an estimation section" and "a mitigation section") so as to correct color registration errors using the mark sensor 15 while adequately adjusting the sensitivity of the mark sensor 15.

Particularly, the CPU 40 (i.e., an example of a computer connected to the sensor) executes a sensor adjustment program retrieved from the ROM 41, in order to implement a sensor adjustment method that includes a sensor sensitivity adjustment process and a low-reference adjustment process. The details of these processes will be explained later.

The display section 45 includes a liquid crystal display, indicator lamps and the like. Thereby, various setting screens, the operating condition of the printer 1, and the like, can be displayed. The operation section 46 includes a plurality of buttons, and thereby a user can perform various input operations. The drive mechanism 47 includes a drive motor and the like, and thereby can rotate the belt 13 and the like.

(Mark Sensor)

Figure 3:
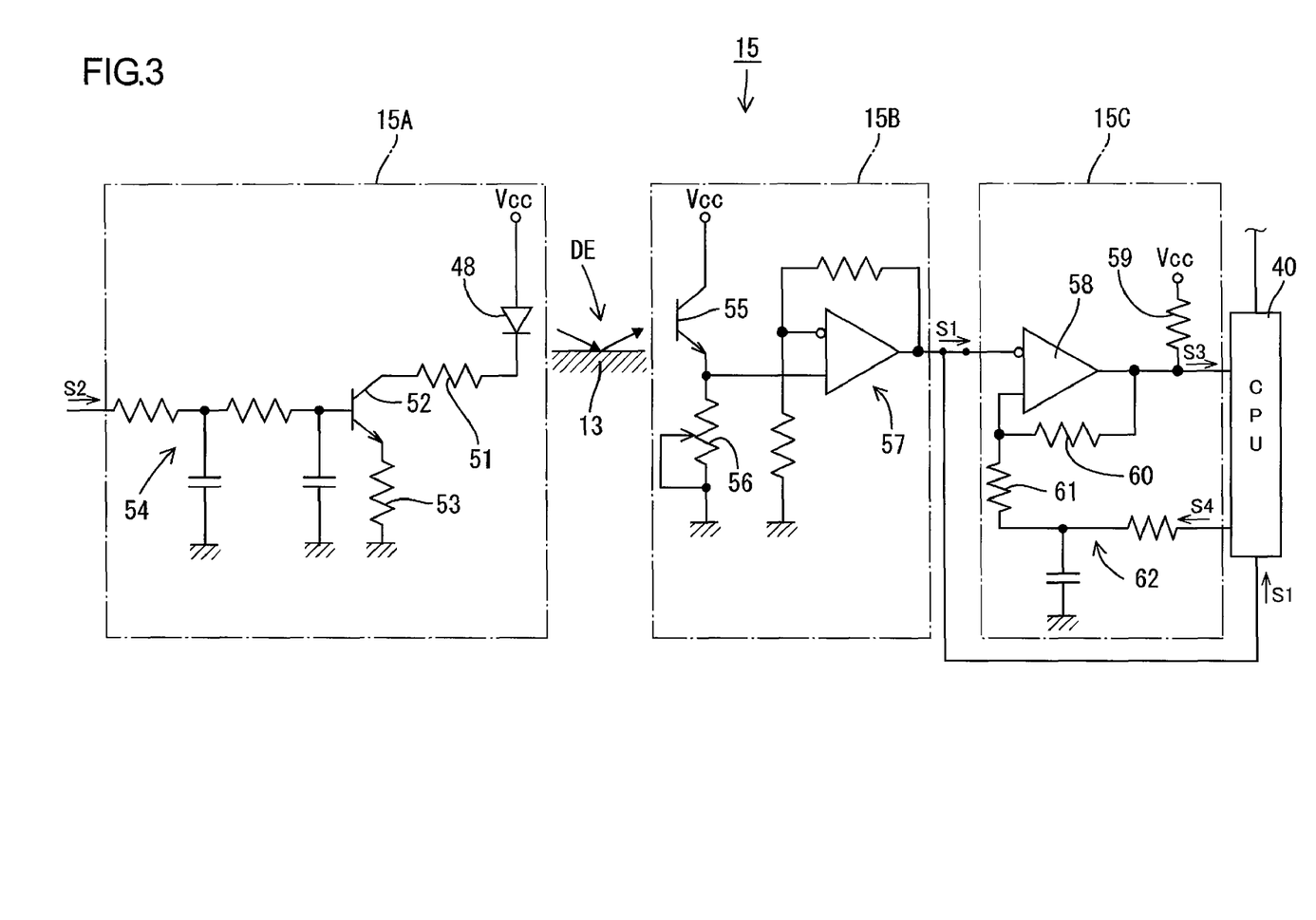
FIG. 3 is a diagram showing the circuit configuration of a mark sensor.

FIG. 3 is a diagram showing the circuit configuration of the mark sensor 15. The mark sensor 15 is arranged to detect the state of an object (e.g., the belt 13) present in a predefined detection area DE. In the present illustrative aspect, the detection area DE is located on the path of the belt 13. The mark sensor 15 includes a light emitting circuit 15A (i.e., an example of a light emitting section), a light receiving circuit 15B (i.e., an example of a light receiving section) and a comparator circuit 15C.

The light emitting circuit 15A irradiates the detection area DE with light. The light receiving circuit 15B receives the light reflected from the detection area DE, and outputs a light sensitive signal S1 indicative of the amount of the received light. The comparator circuit 15C receives the light sensitive signal S1 from the light receiving circuit 15B, and compares the level of the light sensitive signal S1 with a criterion level.

The light emitting circuit 15A includes a light emitting element 48 formed of an LED. The anode of the light emitting element 48 is connected to the power line Vcc, while the cathode thereof is grounded via resistors 51, 53 and a switching element 52. The intensity of light emitted by the light emitting element 48 can be controlled by the CPU 40.

Specifically, the CPU 40 outputs a PWM signal as a light control signal S2, which is supplied to the switching element 52 via a smoothing circuit 54. If the CPU 40 increases the PWM value (or duty cycle) of the light control signal S2, the drive current through the switching element 52 is increased and thereby the intensity of light from the light emitting element 48 is increased. Thus, the CPU 40 can adjust the intensity of light emitted from the light emitting circuit 15A, and thereby the sensitivity of the mark sensor 15 can be adjusted to a target level as described below.

The light receiving circuit 15B includes a light receiving element 55 formed of a phototransistor. The collector of the light receiving element 55 is connected to the power line Vcc, while the emitter thereof is grounded via a variable resistor 56. A light sensitive signal S1 having a level (or voltage value) corresponding to the amount of light reflected from the detection area DE is outputted from the emitter of the light receiving element 55. The light sensitive signal S1 is supplied to the comparator circuit 15C via an amplifier circuit 57. The light sensitive signal S1 is also supplied to the CPU 40 via an A/D converter not shown.

In the present illustrative aspect, the level of the light sensitive signal S1 outputted from the light receiving circuit 15B increases as the amount of light reflected from the detection area DE increases. At the time of manufacture of the printer 1, the light sensitivity level of the light receiving element 55 (i.e., the ratio of the level of the light sensitive signal 51 to the amount of received light) is adjusted by varying the resistance value of the variable resistor 56.

The comparator circuit 15C includes an operational amplifier 58, resistors 59, 60, 61 and a smoothing circuit 62. The output of the light receiving circuit 15B is connected to one of the input terminals of the operational amplifier 58, so that the light sensitive signal 51 is level-inverted and supplied to the operational amplifier 58. The output terminal of the operational amplifier 58 is connected to the power line Vcc via the pull-up resistor 59 and also to the CPU 40.

The voltage-dividing circuit formed of the resistors 60, 61 supplies a divided voltage, which is applied as a criterion level to the other input terminal of the operational amplifier 58. According to the construction, the operational amplifier 58 compares the level of the light sensitive signal S1 with the criterion level, and outputs a binary signal S3 indicating the comparison result to the CPU 40. Specifically, the operational amplifier 58 outputs a binary signal S3 of low level when the level of the light sensitive signal S1 is higher than the criterion level.

The CPU 40 can set the criterion level by a criterion setting signal S4. Specifically, the CPU 40 outputs a PWM signal as the criterion setting signal S4, which is supplied to the voltage-dividing circuit 60, 61 via the smoothing circuit 62. The CPU 40 can adjust the criterion level by varying the PWM value of the criterion setting signal S4. During a registration error correction process described below, the criterion level is set to a predetermined detection criterion level (e.g., 2.0V). During a sensor sensitivity adjustment process described below, the criterion level is set to any of two predetermined reference levels, i.e., a first reference level as a high reference level VH (e.g., 3.0V) and a second reference level as a low reference level VL (e.g., 1.0V).

(Registration Error Correction Process)

In the printer 1, a registration error correction process (i.e., an example of an error correction process) is executed to prevent the misalignment of images to be transferred from the respective image forming units 20 to a sheet 3 (i.e., to prevent a color shift in a color image to be formed on the sheet 3). The execution of the registration error correction process may be started when a predetermined condition is satisfied. The predetermined condition is that the elapsed time or the number of printed sheets since previous execution of color registration error correction reaches a predetermined reference value, for example.

In the present illustrative aspect, the displacement amounts of images of three colors (i.e., yellow, magenta and cyan, and hereinafter referred to as adjustive colors) from a black image in the secondary scanning direction D2 are estimated based on measurement of a detection pattern DP, and correction values for the adjustive colors are determined so as to cancel the estimated displacement amounts. That is, color registration errors in the secondary scanning direction D2 are corrected using black color as a reference color.

Figure 4:
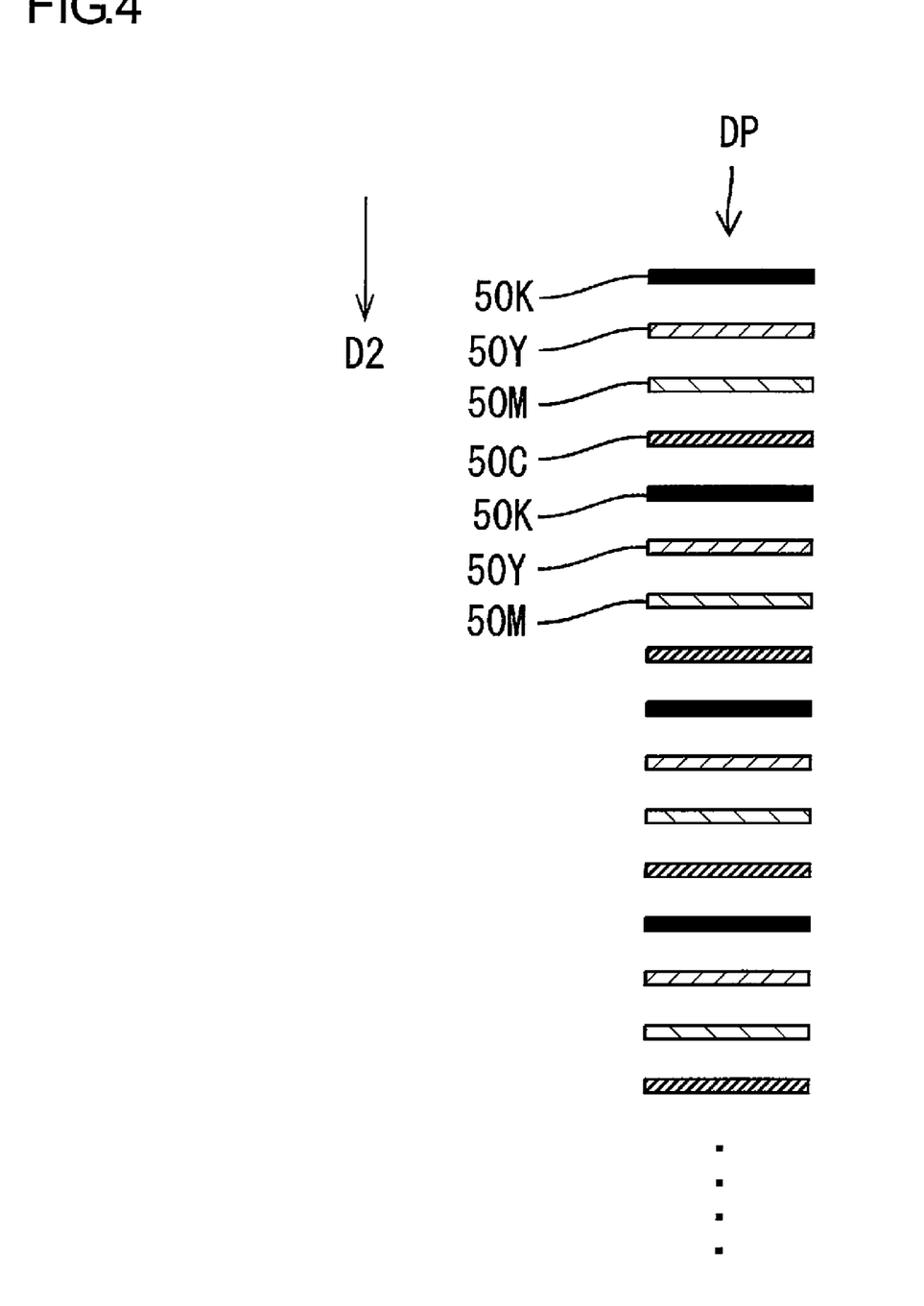
FIG. 4 is a diagram showing a detection pattern used for measuring color registration errors.

FIG. 4 shows a detection pattern DP to be formed on the belt 13 for measurement of color registration errors. The detection pattern DP includes a plurality of marks 50, which includes marks 50K, 50Y, 50M, 50C of four colors. Each mark 50K, 50Y, 50M, 50C has a shape elongated along the main scanning direction, and the marks 50K, 50Y, 50M, 50C are arranged spaced apart along the secondary scanning direction D2.

Specifically, a black mark 50K, a yellow mark 50Y, a magenta mark 50M and a cyan mark 50C are arranged in this order, so as to form a mark group. A plurality of mark groups are arranged spaced apart along the secondary scanning direction D2. In the present illustrative aspect, the marks 50K, 50Y, 50M, 50C of four colors are equally spaced apart when there is no color registration error.

In the registration error correction process, while the belt 13 is rotated by the drive mechanism 47, the detection pattern DP is formed on the belt 13 using the image forming units 20, and the positions of the marks 50K to 50C are detected using the mark sensor 15. The CPU 40 applies a light control signal S2 to the light emitting circuit 15A during the detection of the marks 50K to 50C, and the PWM value of the light control signal S2 at the time is set to a sensitivity-adjusted PWM value that can be obtained as a result of execution of a sensor sensitivity adjustment process described below.

The level of the light sensitive signal S1 outputted from the light receiving circuit 15B is high, when none of the marks 50K to 50C is present in the detection area DE of the mark sensor 15 and therefore the light from the light emitting circuit 15A is reflected by the bare surface of the belt 13 (i.e., an example of a most highly reflective object having a possibility of being present in the detection area DE). The level of the light sensitive signal S1 is low, when any of the marks 50K to 50C is present in the detection area DE and therefore the light from the light emitting circuit 15A is reflected by the mark-formed area of the belt 13.

Hereinafter, the level of the light sensitive signal S1 when none of the marks 50K to 50C is present in the detection area DE is sometimes referred to as "belt-reflection signal level", while the level of the light sensitive signal S1 when any of the marks 50K to 50C is present in the detection area DE is sometimes referred to as "mark-reflection signal level". In the present illustrative aspect, the belt-reflection signal level is preferably set to a level (e.g., 4.0V) substantially equal to the saturation level, by a sensor sensitivity adjustment process described below.

The detection criterion level for the comparator circuit 15C is set by the CPU 40 to a middle level (e.g., 2.0V) between the belt-reflection signal level and the mark-reflection signal level. The CPU 40 measures the positions of the marks 50 based on times when the binary signal S3 switches between a high level and a low level during the detection of the marks 50.

Based on the result of the measurement of the marks 50, the CPU 40 estimates errors in positions of marks 50Y, 50M, 50C of adjustive colors, using the positions of black marks 50K as reference points. Specifically, for each mark group, the CPU 40 calculates the relative distance between the mark 50K of the reference color and the mark 50Y, 50M, 50C of each adjustive color. The calculated values of the relative distances are averaged for all mark groups, and thereby the average value of the relative distance between the black mark 50K and the mark 50Y, 50M, 50C of each adjustive color can be obtained.

Further, the CPU 40 subtracts a predetermined ideal value from the average value, and thereby determine the estimated displacement amount of an image of each adjustive color from its proper position in the secondary scanning direction D2. A new correction value is calculated for each adjustive color, so that the estimated displacement amount in the secondary scanning direction D2 can be canceled by the new correction value. Thus, the new correction values are calculated for respective adjustive colors, and the correction values currently stored in the NVRAM 43 are updated or replaced with the new correction values.

In future operations for image formation, the positions of images of respective adjustive colors are corrected based on the correction values stored in the NVRAM 43, so that a color image on a sheet 3 as a printing result will not include a color shift caused by color registration errors. Specifically, the timing of light emission during line scanning by the respective exposure units 17Y to 17C is adjusted based on the correction values so that color registration errors in the secondary scanning direction D2 can be prevented.

(Low-reference Adjustment Process)

In the printer 1, the CPU 40 periodically executes a low-reference adjustment process in order to adjust or modify the low reference level VL (i.e., a predetermined reference level of the light sensitive signal S1), which is used by a sensor sensitivity adjustment process described below. The low-reference adjustment process is executed at predetermined time intervals after power-on of the printer 1, independently of execution of the sensor sensitivity adjustment process.

A brief explanation of the low-reference adjustment process is as follows: A leakage current may be generated on the light receiving circuit 15B, and the light sensitive signal S1 may be influenced by the leakage current. The PWM value corresponding to the low reference level VL of the light sensitive signal S1 is measured during the sensor sensitivity adjustment process as described below, while the low-reference adjustment process adjusts the value of the low reference level VL so as to mitigate the influence of the leakage current on the measurement of the PWM value corresponding to the low reference level VL.

Figure 5:
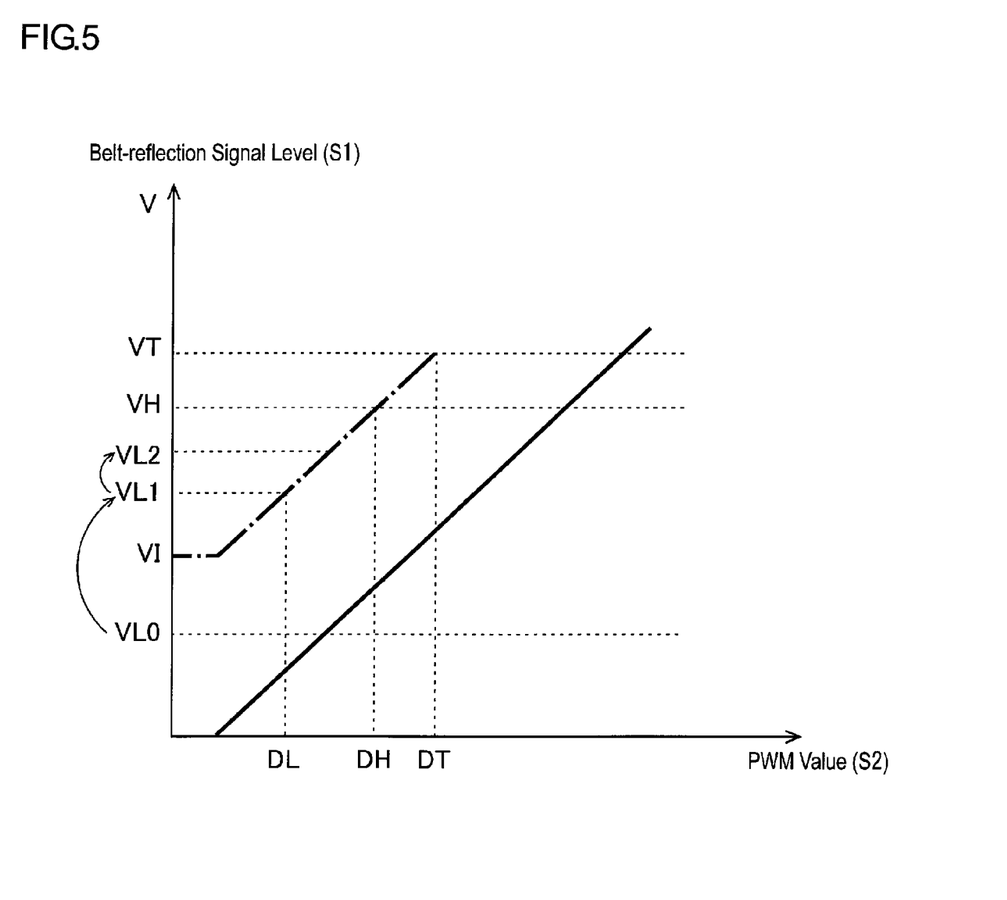
FIG. 5 is a graph showing the relationship between the PWM value for a light control signal and the level of a light sensitive signal indicative of the amount of light reflected from a bare belt surface.

FIG. 5 is a graph showing the relationship between the PWM value for the light control signal S2 and the belt-reflection signal level (i.e., the level of the light sensitive signal S1 indicative of the amount of light reflected from an exposed area of the belt 13 or an area where a mark 50 is not formed). In the figure, the solid line shows the light sensitive signal S1 free of the influence from a leakage current, while the chain line shows the light sensitive signal S1 influenced by a leakage current. The levels VL0, VL1, VL2 indicate set values of the low reference level VL. The value DL of the PWM value (hereinafter, referred to as "a low PWM value DL") indicates the PWM value corresponding to the low reference level VL1 of the light sensitive signal S1.

Figure 6:
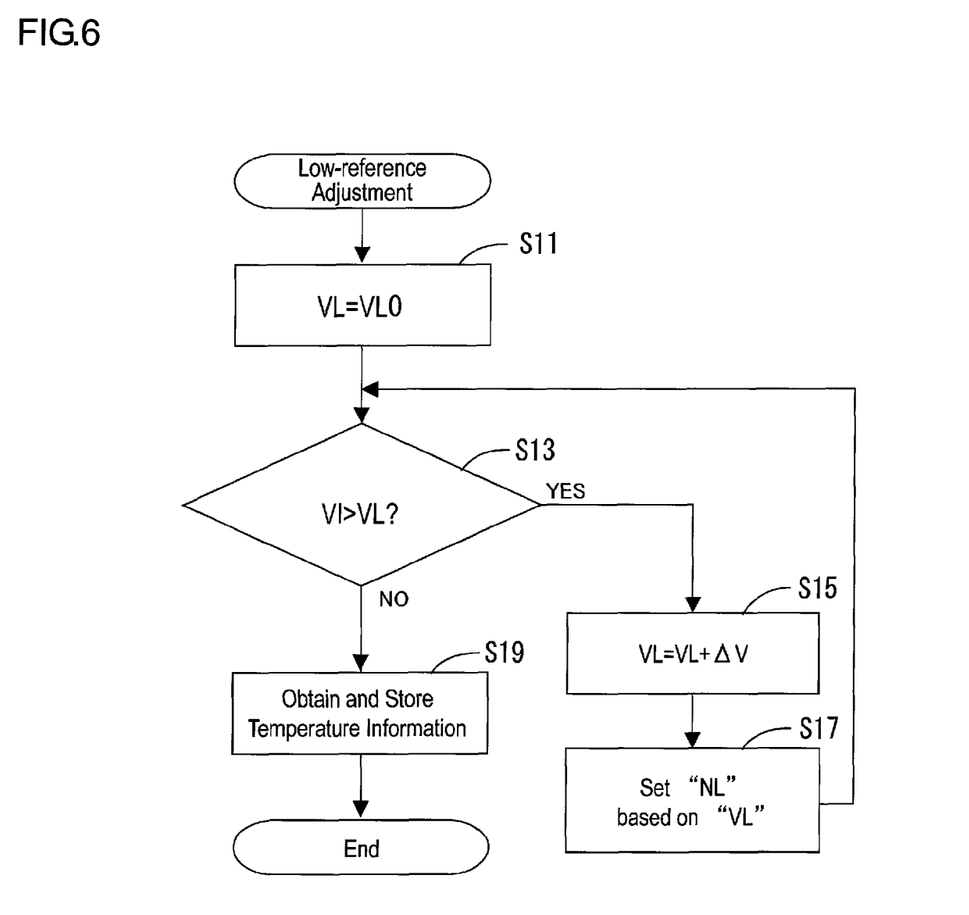
FIG. 6 is a flowchart of a low-reference adjustment process.

FIG. 6 is a flowchart of the low-reference adjustment process. Referring to the figure, the CPU 40 first sets the low reference level VL to an initial value VL0 (e.g., 1.0V) at step S11. Next, at step S13, the CPU 40 estimates whether the amount of a leakage current generated on the light receiving circuit 15B of the mark sensor 15 is larger than a reference amount. The leakage current can flow through the light receiving element 55 even when the light is not emitted from the light emitting element 48. In FIG. 5, the level VI of the light sensitive signal S1 (when the PWM value is zero) indicates the amount of the leakage current, which is hereinafter referred to as a leakage current level VI.

In the present illustrative aspect, specifically, the CPU 40 obtains the light sensitive signal S1 (i.e., belt-reflection signal level) from the light receiving circuit 15B while the light emitting circuit 15A is OFF, and thereby determines the leakage current level VI (as a measurement value associated with the amount of the leakage current). Further, the current value (or provisional value) of the low reference level VL is used as the above reference amount for the leakage current. Therefore, actually, the CPU 40 determines at step S13 whether the leakage current level VI is higher than the low reference level VL.

Alternatively, the reference amount may be set to a reference value that is larger than the current value of the low reference level VL by a predetermined value (larger than zero). In this case, the CPU 40 determines at step S13 whether the leakage current level VI is higher than the reference value. The CPU 40 when executing step S13 functions as "an estimation section" of the present invention, and step S13 corresponds to "an estimation process" of the present invention.

Returning to FIG. 6, if it is determined that the leakage current level VI is higher than the low reference level VL (i.e., "Yes" is determined at step S13), the CPU 40 estimates that the amount of the leakage current is larger than the reference amount, and therefore increases the value of the low reference level VL by a predetermined amount ΔV at step S15. The new value of the low reference level VL is stored in the NVRAM 43, for example. The CPU 40 when executing step S15 functions as "a mitigation section" of the present invention, and step S15 corresponds to "a mitigation process" of the present invention.

Next, at step S17, the required number of samples to be obtained as measured values of the low PWM value DL by the sensor sensitivity adjustment process is determined based on the new value of the low reference level VL. As described above, the low PWM value DL corresponding to the low reference level VL of the light sensitive signal S1 is measured during the sensor sensitivity adjustment process. In the present illustrative aspect, the required number of samples (hereinafter, referred to as "the number NL of low reference samples") is set to increase with increase of the low reference level VL.

The reason for increasing the number NL of low reference samples is as follows: The correlation between the PWM value set for the light control signal S2 and the actual intensity of light emitted from the light emitting circuit 15A (and therefore, the correlation between the PWM value and the level of the light sensitive signal S1) becomes less stable with increase of the set value of the PWM value (or increase of the intensity of emitted light), in general. That is, the actual intensity of light emitted from the light emitting circuit 15A greatly varies even while the PWM value is fixed to a specific value, if the specific value is a relatively large value.

In view of this, at step S17, the number NL of low reference samples is varied to increase with increase of the low reference level VL. In the present illustrative aspect, specifically, the number NL of low reference samples is set to "1" when the low reference level VL is set to the initial value VL0. When the low reference level VL is set to a new value larger than the initial value VL0 at step S15, the number NL of low reference samples is increased from "1" according to the increase of the new value from the initial value VL0.

Consequently, during the sensor sensitivity adjustment process, the accuracy of the measurement of the low PWM value DL (corresponding to the low reference level VL of the light sensitive signal S1) is improved, which can lead to improved accuracy in sensitivity adjustment of the mark sensor 15.

The number NL of low reference samples, determined at step S17, is stored in the NVRAM 43, and thereafter the process returns to step S13. If it is determined again that the leakage current level VI is higher than the current value (or new value) of the low reference level VL (i.e., "Yes" is determined at step S13), the value of the low reference level VL is further increased from the current value by the predetermined amount ΔV at step S15.

Thus, the modification of the low reference level VL at step S15 and the setting of the number NL of low reference samples at step S17 are repeated until the CPU 40 determines that the leakage current level VI is equal to or lower than the current value of the low reference level VL (i.e., "No" is determined at step S13). In FIG. 5, the level VL1 indicates the value of the low reference level VL that is ultimately determined by the repetition of steps S13 to S17.

When it is determined that the leakage current level VI is equal to or lower than the current value of the low reference level VL (i.e., "No" is determined at step S13), the CPU 40 obtains information about the temperature in the casing 2 from the temperature sensor 49, at step S19. The temperature information is stored in the NVRAM 43, for example, and then the present iteration of the low-reference adjustment process terminates. In this way, the set value of the low reference level VL, the number NL of low reference samples and the temperature information stored in the NVRAM 43 are updated at each iteration of the low-reference adjustment process.

Referring to FIG. 5, when a leakage current is generated on the light receiving circuit 15B, the level of the light sensitive signal S1 may be influenced by the leakage current, as shown by the chain line. In this case, the measurement of the low PWM value DL during the sensor sensitivity adjustment process is impossible if the low reference level VL is set to the initial value VL0. However, according to the present illustrative aspect, the low reference level VL is increased to the higher level VL1 by the low-reference adjustment process, so that the influence of the leakage current on the measurement of the low PWM value DL is mitigated. Accordingly, the low PWM value DL corresponding to the low reference level VL can be properly measured during future execution of the sensor sensitivity adjustment process.

(Sensor Sensitivity Adjustment Process)

Figure 7:
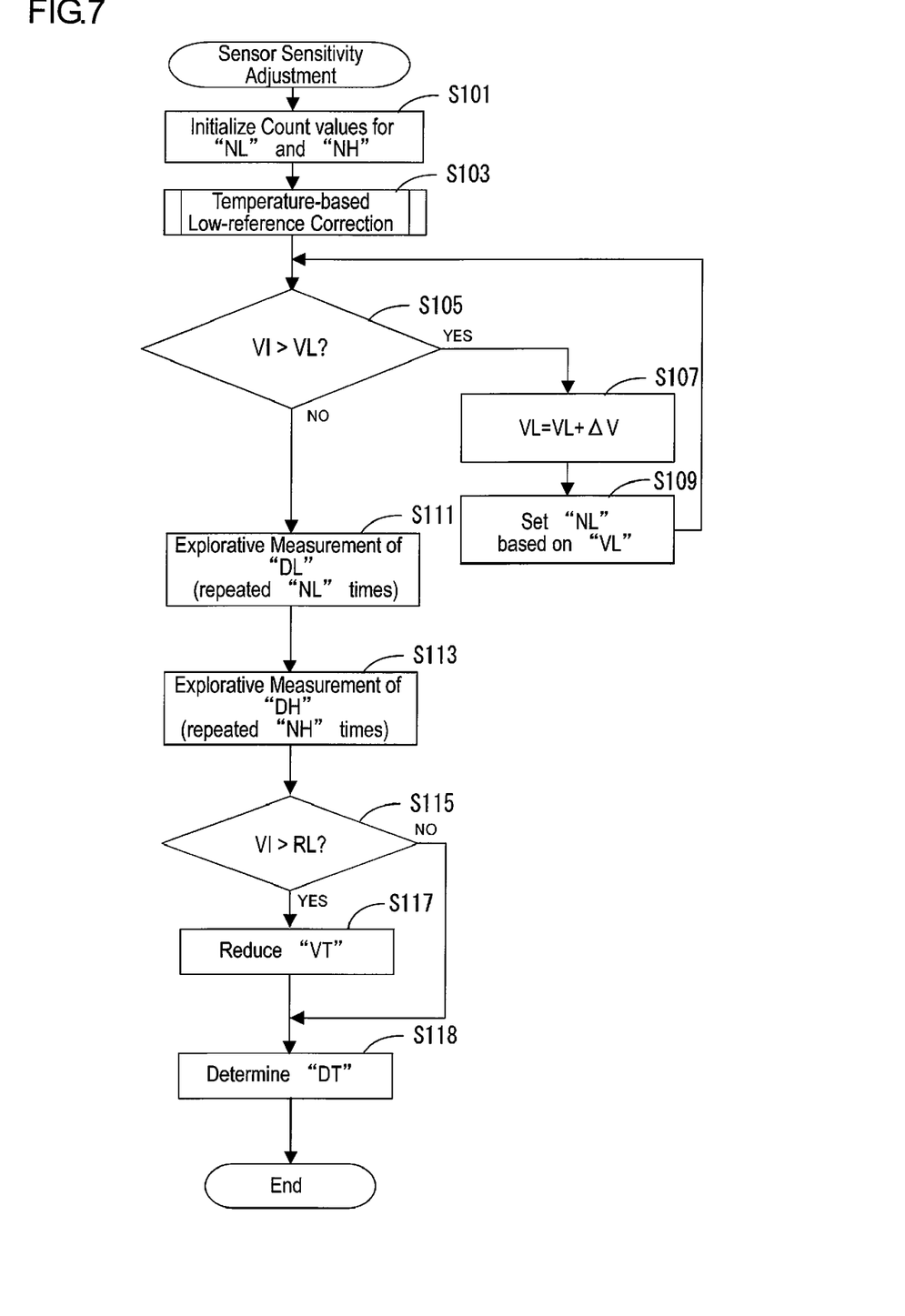
FIG. 7 is a flowchart of a sensor sensitivity adjustment process.
Figure 8:
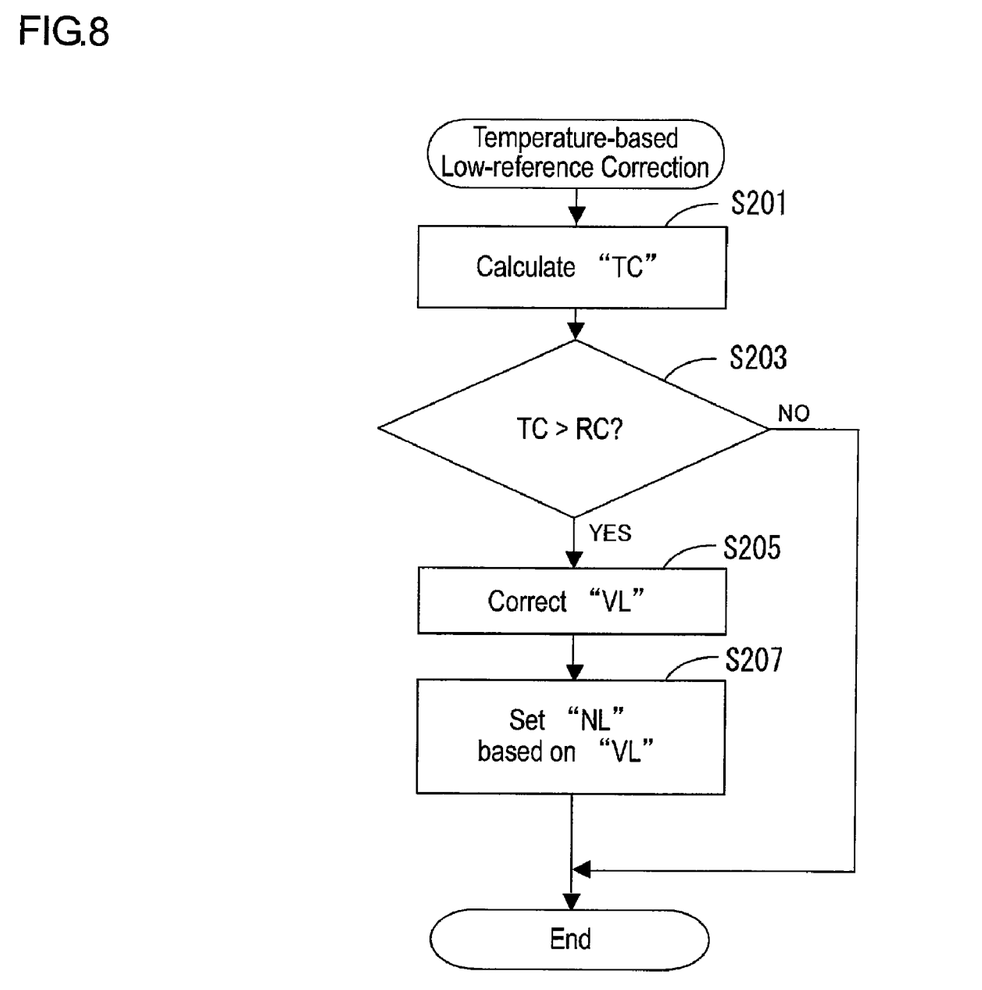
FIG. 8 is a flowchart of a temperature-based low-reference correction process.

FIG. 7 is a flowchart of a sensor sensitivity adjustment process (i.e., an example of a sensor adjustment process) to be executed for sensitivity adjustment of the mark sensor 15. FIG. 8 is a flowchart of a temperature-based low-reference correction process to be executed in the sensor sensitivity adjustment process.

The mark sensor 15 is mainly used for measurement of marks 50 by the registration error correction process, as described above. In the sensor sensitivity adjustment process, the sensitivity of the mark sensor 15 is adjusted to a target level, so that the accuracy of the measurement of the marks 50 can be improved.

More specifically, in the present illustrative aspect, the belt-reflection signal level (i.e., the level of the light sensitive signal S1 when the mark 50 is not present in the detection area DE) is adjusted to a target level VT, by varying the set value of the intensity of light emitted from the light emitting circuit 15A (i.e., the set value of the PWM value for the light control signal S2). The PWM value (or the intensity of light emitted from the light emitting circuit 15A) is an example of an adjustable characteristic value associated with the sensitivity of the mark sensor 15.

In the present illustrative aspect, the target level VT is set to a level (e.g., 4.0V) substantially equal to the saturation level, as described above. If the belt-reflection signal level is thus adjusted to the level extremely close to the saturation level, the influence of noise components of the light sensitive signal S1, e.g., caused by a scratch on the belt 13, can be reduced.

The execution of the sensor sensitivity adjustment process is started when a predetermined condition is satisfied (e.g., immediately after power-on of the printer 1 or immediately before execution of a registration error correction process). The CPU 40 when executing the sensor sensitivity adjustment process functions as "a sensor adjustment section" of the present invention.

The CPU 40 causes the drive mechanism 47 to rotate the belt 13, and then starts the execution of the sensor sensitivity adjustment process. Referring to FIG. 7, the CPU 40 first initializes the count value for the number NL of low reference samples and the count value for the number NH of high reference samples, at step S101. Thereby, both of the count values are set to zero.

Next, at step S103, the CPU 40 executes a temperature-based low-reference correction process shown in FIG. 8. In the temperature-based low-reference correction process, the amount of temperature change TC, since the modification of the low reference level VL at step S15 of the low-reference adjustment process, is determined at step S201.

Specifically, the information about the current temperature is obtained from the temperature sensor 49, while the temperature information obtained at step S19 of the low-reference adjustment process is retrieved from the NVRAM 43. The amount of temperature change TC is calculated based on the retrieved temperature information and the current temperature information. The CPU 40 when executing step S201 functions as "a temperature acquisition section".

Next, the CPU 40 determines at step S203 whether the amount of temperature change TC is larger than a reference temperature change RC. If it is determined that the amount of temperature change TC is larger than the reference temperature change RC (i.e., "Yes" is determined at step S203), the current amount of the leakage current is likely to differ from that at the time of earlier execution of the low-reference adjustment process. Therefore, the low reference level VL is further modified (or corrected) at step S205, in this case.

Specifically, a correction amount is calculated by multiplying the amount of temperature change TC by a predetermined correction factor, and a corrected value of the low reference level VL is calculated by adding the correction amount to the current value (e.g., VL1) of the low reference level VL. In FIG. 5, the level VL2 indicates the corrected value of the low reference level VL. The corrected value VL2 is stored as a new value of the low reference level VL in the NVRAM 43. The CPU 40 when executing step S205 functions as "a correction section".

At step S207, the number NL of low reference samples is varied according to the new value VL2 of the low reference level VL, in a similar manner to step S17 of the low-reference adjustment process. Then, the temperature-based low-reference correction process terminates. If it is determined that the amount of temperature change TC is equal to or smaller than the reference temperature change RC (i.e., "No" is determined at step S203), steps S205 and S207 are skipped, and the temperature-based low-reference correction process immediately terminates.

Returning to FIG. 7, when the correction of the low reference level VL at step S103 is completed, steps S105 to S109 are executed in a similar manner to steps S13 to S17 of the low-reference adjustment process. That is, the comparison of the leakage current level VI with the low reference level VL is performed again at step S105, and the modification of the low reference level VL at step S107 and the setting of the number NL of low reference samples at step S109 are repeated until the CPU 40 determines that the leakage current level VI is equal to or lower than the new value of the low reference level VL (i.e., "No" is determined at step S105).

These steps S105 to S109 may be omitted from the sensor sensitivity adjustment process, because of the periodic execution of the low-reference adjustment process independent of the execution of the sensor sensitivity adjustment process. However, the execution of steps S105 to S109 in the sensor sensitivity adjustment process can lead to improved accuracy in adjustment of the sensitivity of the mark sensor 15 (i.e., adjustment of the belt-reflection signal level to the target level VT).

Next, at step S111, the CPU 40 performs explorative measurement of the low PWM value DL (i.e., the PWM value for the light control signal S2 corresponding to the low reference level VL of the light sensitive signal S1). Specifically, the CPU 40 sets the criterion level for the comparator circuit 15C to the low reference level VL, and applies a light control signal S2 to the light emitting circuit 15A.

At the time, the PWM value for the light control signal S2 is first set to an initial value, and thereafter is iteratively increased by predetermined increments, during which the binary signal S3 from the comparator circuit 15C switches between a high level and a low level when the level of the light sensitive signal 51 (i.e., belt-reflection signal level) has reached the low reference level VL.

The PWM value is measured when the belt-reflection signal level has reached the low reference level VL, and is temporarily stored as a measured value of the PWM value (or a measured value of the intensity of light emitted from the light emitting circuit 15A) that corresponds to the low reference level VL.

Note that the initial value of the PWM value should be determined so that the belt-reflection signal level is lower than the low reference level VL when the PWM value is set to the initial value. For example, the initial value of the PWM value can be set so that the belt-reflection signal level is equal to the initial value VL0 of the low reference level VL when the PWM value is set to the initial value.

The explorative measurement of the low PWM value DL is repeated while incrementing the count value, until the count value reaches a predetermined number (i.e., the number NL of low reference samples, predetermined as the number of repetitions of the explorative measurement). Thereby, the CPU 40 can obtain the predetermined number of measured values. The average value of the measured values is determined as a final measured value of the low PWM value DL (i.e., the PWM value corresponding to the low reference level VL).

For example, FIG. 5 shows the low PWM value DL when the low reference level VL is set to the level VL1. Referring to FIG. 5, when the leakage current is generated on the light receiving circuit 15B (as indicated by the level VI), the measurement of the low PWM value is impossible if the low reference level VL is set to the initial value VL0. However, according to the present illustrative aspect, the low reference level VL is preliminarily adjusted to be higher than the leakage current level VI by the low-reference adjustment process, and therefore the low PWM value DL corresponding to the low reference level VL1 can be properly measured during the sensor sensitivity adjustment process.

Next, at step S113, the CPU 40 performs explorative measurement of the high PWM value DH (i.e., the PWM value for the light control signal S2 corresponding to the high reference level VH of the light sensitive signal S1). Referring to FIG. 5, the high reference level VH is set to a level (e.g., 3.0V) higher than the low reference level VL. At step S113, specifically, the CPU 40 sets the criterion level for the comparator circuit 15C to the high reference level VH, and applies a light control signal S2 to the light emitting circuit 15A.

At the time, the PWM value for the light control signal S2 is first set to an initial value, and thereafter is iteratively increased by predetermined increments, during which the binary signal S3 from the comparator circuit 15C switches between a high level and a low level when the level of the light sensitive signal S1 (i.e., belt-reflection signal level) has reached the high reference level VH.

The PWM value is measured when the belt-reflection signal level has reached the high reference level VH, and is temporarily stored as a measured value of the PWM value (or a measured value of the intensity of light emitted from the light emitting circuit 15A) that corresponds to the high reference level VH.

Note that the initial value of the PWM value should be determined so that the belt-reflection signal level is lower than the high reference level VH when the PWM value is set to the initial value. For example, the initial value of the PWM value can be set so that the belt-reflection signal level is equal to the initial value VL0 of the low reference level VL when the PWM value is set to the initial value.

The explorative measurement of the high PWM value DH is repeated while incrementing the count value, until the count value reaches a predetermined number (i.e., the number NH of high reference samples, predetermined as the number of repetitions of the explorative measurement). Thereby, the CPU 40 can obtain the predetermined number of measured values. The average value of the measured values is determined as a final measured value of the high PWM value DH (i.e., the PWM value corresponding to the high reference level VH).

When the explorative measurement of the low PWM value DL and the high PWM value DH at steps S111 and S113 is completed, then the CPU 40 determines at step S115 whether the leakage current level VI is higher than a reference leakage current level RL. If it is determined that the leakage current level VI is higher than the reference leakage current level RL (i.e., "Yes" is determined at step S115), the set value of the target level VT is reduced at step S117 to be lower than the saturation level.

The reason for lowering the target level VT is as follows: The mark-reflection signal level (i.e., the level of the light sensitive signal S1 when the light receiving circuit 15B receives the light reflected from the mark-formed area of the belt 13) increases with increase of the leakage current level VI. Therefore, when the leakage current level VI is relatively high, the mark-reflection signal level may fail to be lower than the predetermined detection criterion level if the belt-reflection level is set to a level close to the saturation level. The mark-reflection signal level being lower than the predetermined detection criterion level can result in failure in detection of the marks 50.

In view of this, according to the present illustrative aspect, the target level VT is reduced to a level (e.g., 3.5V) lower than the saturation level when the leakage current level VI is higher than the reference leakage current level RL. Thereby, the mark-reflection signal level can be lower than the predetermined detection criterion level in spite of the high leakage current level, which enables the detection of the marks 50. When the lowering of the target level VT at step S117 is completed, the process proceeds to step S118.

If it is determined that the leakage current level VI is equal to or lower than the reference leakage current level RL (i.e., "No" is determined at step S115), step S117 is skipped and the process proceeds to step S118.

At step S118, the CPU 40 determines a sensitivity-adjusted PWM value DT (i.e., the PWM value corresponding to the target level VT of the light sensitive signal S1 or the PWM value to be used for detection of the marks 50), according to the following formula:

$$DT=DH+(VT-VH)*((DH-DL)/(VH-VL))$$

where "VL" is the low reference level, "VH" is the high reference level, "DL" is the low PWM value, and "DH" is the high PWM value.

If the PWM value for the light control signal S2 is set to the sensitivity-adjusted PWM value DT (i.e., the PWM value determined at step S118), the level of the light sensitive signal S1 (or specifically, the belt-reflection signal level) can be at the target level VT. Thus, the sensitivity of the mark sensor 15 is adjusted to the target level, and then the sensor sensitivity adjustment process terminates.

(Effect of the Present Illustrative Aspect)

In the present illustrative aspect, if it is estimated that the amount of a leakage current generated on the light receiving circuit 15B is larger than the reference amount (or specifically, when the leakage current level VI is higher than the low reference level VL), the set value of the low reference level VL is modified so that the influence of the leakage current on the explorative measurement of the low PWM value DL (i.e., the PWM value corresponding to the low reference level VL) is mitigated. Consequently, the adjustment of the sensitivity of the mark sensor 15 (i.e., the adjustment of the level of the light sensitive signal S1) can be adequately achieved while the influence of the leakage current on the adjustment is suppressed.

Further, in the present illustrative aspect, the low-reference adjustment process is executed at predetermined time intervals, independently of execution of the sensor sensitivity adjustment process. That is, the modification of the low reference level VL based on the estimation of the leakage current is completed before execution of the sensor sensitivity adjustment process that is started when a predetermined condition is satisfied. Thus, the influence of the leakage current on the sensor sensitivity adjustment can be mitigated without increasing the complexity of the sensor sensitivity adjustment process.

<Other Illustrative Aspects>

The present invention is not limited to the aspect explained in the above description made with reference to the drawings. The following aspects may be included in the technical scope of the present invention, for example. Particularly, the components, which are shown in the above aspect but do not correspond to the components described in a generic claim of the present application, may be arbitrarily omitted.

(1) In the above aspect, a detection pattern DP to be used for measurement of color registration errors is formed on the belt 13, and the mark sensor 15 is used to measure the color registration errors on the detection pattern DP. However, the mark sensor 15 is not limited to being used for measurement of color registration errors. For example, the mark sensor 15 may be used by an image density error correction process, in order to measure the image density errors on a detection pattern that is formed as an image density patch on the belt 13.

In the above aspect, the detection area DE of the sensor 15 is located on the path of the belt 13. However, a sensor of the present invention may be arranged to detect the remaining amount of toner contained in the toner container 23, or to detect a sheet 3 on the paper path or in the tray 4. In these cases, the sensor is not limited to an optical reflection sensor as in the above aspect, but rather may be an optical transmission sensor.

(2) In the above aspect, the sensitivity adjustment of the sensor 15 is achieved by adjusting the intensity of light emitted from the light emitting circuit 15A (i.e., the PWM value for the light control signal S2). However, the adjustable characteristic value to be adjusted by the sensor sensitivity adjustment process (or sensor adjustment process) is not limited to the intensity of light emitted from the light emitting circuit 15A, but rather may be the light sensitivity level of the light receiving circuit 15B.

For example, the light sensitivity level of the light receiving circuit 15B (i.e., the photoelectric conversion rate of the light receiving element 55 for converting the received light amount to the level of the light sensitive signal S1) can be adjusted by varying the gain of the amplifier circuit 57 or the resistance of the variable resistor 56.

In this case, the explorative measurement of the gain values of the amplifier circuit 57 or the resistance values of the variable resistor 56 corresponding to the low reference level VL and the high reference level VH is performed during a sensor sensitivity adjustment process, and a sensitivity-adjusted gain value or resistance value (i.e., the gain value or resistance value to be used for detection of the marks 50) is determined based on the result of the explorative measurement.

(3) In the above aspect, the explorative measurement of the PWM values DL and DH corresponding to the two reference levels (i.e., the low reference level VL and the high reference level VH) of the light sensitive signal S1 is performed at steps S111 and S113 during the sensor sensitivity adjustment process, and the sensitivity-adjusted PWM value DT (i.e., the PWM value corresponding to the target level VT of the light sensitive signal S1) is determined at step S118 based on a correlation between the PWM value and the level of the light sensitive signal S1, which is obtained from the result of the explorative measurement (i.e., from the PWM values DL, DH and the reference levels VL, VH).

However, the explorative measurement of the PWM values may be performed using or based on three or more reference levels of the light sensitive signal S1. In this case, the sensitivity-adjusted PWM value (i.e., the PWM value corresponding to the target level VT of the light sensitive signal S1) can be obtained from the result of the explorative measurement (i.e., from the three or more PWM values and the three or more reference levels), for example, by least squares approximation.

(4) In the above aspect, the mark sensor 15 includes a comparator circuit 15C and thereby outputs a binary signal S3 based on the light sensitive signal S1. However, the present invention is not limited to this construction. Instead of the comparator circuit 15C, the CPU 40 may obtain the light sensitive signal S1 from the light receiving circuit 15B via an A/D converter, and compare the obtained light sensitive signal S1 with a criterion level such as the predetermined detection criterion level.

(5) In the above aspect, the color registration errors in the secondary scanning direction D2 are corrected by the registration error correction process. However, the present invention is not limited to this construction. That is, the errors to be corrected by a correction process using the mark sensor 15 can include any other kind of errors in image forming position, such as image line interval errors in a unicolor image. Further, the errors in the main scanning direction may be corrected by a correction process.

(6) In the above aspect, the estimation of the leakage current at step S13 of the low-reference adjustment process or at step S105 of the sensor sensitivity adjustment process is performed based on the light sensitive signal S1 (i.e., belt-reflection signal level) that is obtained from the light receiving circuit 15B while the light emitting circuit 15A is OFF. However, the present invention is not limited to this construction.

For example, the estimation of the leakage current may be performed based on a measurement value of the amount of a leakage current that is directly detected on the light receiving element 55 while the light emitting circuit 15A is OFF.

Alternatively, the estimation of the leakage current may be performed based on a measurement value of the temperature that is detected by the temperature sensor 49, because the amount of the leakage current largely depends on the temperature. For example, it may be determined that the amount of the leakage current is larger than a reference amount, when the measurement value of the temperature is larger than a predetermined reference temperature. That is, the low reference level VL may be modified so as to mitigate the influence of the leakage current on the explorative measurement of the low PWM value DL, when the measurement value of the temperature is larger than the predetermined reference temperature.

Thus, the estimation of the leakage current can be achieved based on the measurement value of the temperature, without obtaining the light sensitive signal 51 or directly detecting the amount of the leakage current. However, in the case that the light sensitive signal S1 is used for estimation of the leakage current as in the above aspect, the amount of the leakage current can be estimated relatively simply and accurately in connection with the influence of the leakage current on the explorative measurement of the low PWM value DL.

(7) In the above aspect, the low reference level VL is modified in order to mitigate the influence of the leakage current on the explorative measurement of the low PWM value DL. However, the present invention is not limited to this construction. Instead of or in addition to modifying the low reference level VL, the light receiving circuit 15B may be adjusted to reduce the leakage current. The adjustment of the light receiving circuit 15B for reduction of the leakage current is achieved by varying the resistance value of the variable resistor 56, for example.

In the case that the mitigation of the influence of the leakage current on the explorative measurement of the low PWM value DL is achieved solely by the adjustment of the light receiving circuit 15B (i.e., without modifying the low reference level VL), a fixed reference amount may be used for estimation of the leakage current at step S13 of the low-reference adjustment process, in contrast to the above aspect where the low reference level VL (as a reference amount varying with change of the low reference level VL) is used for estimation of the leakage current.

(8) In the above aspect, the low reference level VL is modified in order to mitigate the influence of the leakage current on the explorative measurement of the low PWM value DL. However, the present invention is not limited to this construction. Instead of or in addition to the low reference level VL, the high reference level VH may be modified so that the influence of the leakage current on the explorative measurement of the high PWM value DH is mitigated.

(9) In the above aspect, the light sensitive signal S1 outputted from the light receiving circuit 15B has a level that increases as the amount of light reflected from the detection area DE increases. However, the present invention is not limited to this construction. The light receiving circuit 15B may be constructed to output a light sensitive signal S1 having a level that increases as the amount of light reflected from the detection area DE decreases.

In this case, the adjustment of the sensitivity of the mark sensor 15 is performed based on the mark-reflection signal level (i.e., the level of the light sensitive signal S1 when the light receiving circuit 15B receives the light reflected from the mark-formed area of the belt 13), in contrast to the above aspect where the belt-reflection signal level is used for the adjustment of the sensitivity of the mark sensor 15 by the sensor sensitivity adjustment process.

Specifically, during the adjustment of the sensitivity of the mark sensor 15 based on the mark-reflection signal level, a sensitivity-adjusted PWM value (i.e., the PWM value to be used for detection of the marks 50) is determined so that the mark-reflection signal level is set to the target level VT close to the saturation level.

(10) In the above aspect, as well as the adjustment of the low reference level VL during the sensor sensitivity adjustment process, the low-reference adjustment process is executed at predetermined time intervals, independently of execution of the sensor sensitivity adjustment process. However, the present invention is not limited to this construction. For example, the periodical execution of the low-reference adjustment process may be eliminated so that the adjustment of the low reference level VL is performed solely in the sensor sensitivity adjustment process.

(11) In the above aspect, the temperature sensor 49 is arranged to detect the internal temperature of the printer 1. However, the temperature sensor 49 may be arranged to detect the external temperature of the printer 1, for example.

(12) In the above aspect, the low reference level VL is corrected by the temperature-based low-reference correction process, based on the amount of temperature change TC since the modification of the low reference level VL at step S15 of the low-reference adjustment process. However, the present invention is not limited to this construction. The low reference level VL may be corrected based on the difference between the current temperature and a predetermined reference temperature, for example.

(13) In the above aspect, a color printer is shown for illustrative purposes. However, an image forming apparatus of the present invention is not limited to a color printer, but rather may be a printer for printing a unicolor image, such as a monochrome printer. The image forming apparatus of the present invention can further include another kind of electrophotographic printer, i.e., an electrophotographic printer that uses light emitting elements other than LEDs or a laser light source as an exposing source. Further, the present invention can include an ink jet printer as an image forming apparatus.

(14) In the above aspect, a direct-transfer type printer is shown as an image forming apparatus, in which the mark sensor 15 is arranged to detect marks 50 formed on the belt 13 that is provided for conveying a sheet 3. However, the present invention is not limited to this construction. In an intermediate-transfer type printer, the mark sensor 15 may be arranged to detect marks 50 formed on the intermediate transfer belt, for example.

(15) In the above aspect, the sensor sensitivity adjustment process and the low-reference adjustment process are executed by the CPU 40 included in the printer 1. However, these processes may be executed by a CPU included in an external computer (such as a print server or a personal computer), which is connected to the printer 1 so that signal transmission is allowed between the external computer and the sensors 15, 49 included in the printer 1.

What is claimed is:

1. An image forming apparatus comprising:
a sensor configured to detect a state of an object present in a detection area, the sensor having a light emitting section and a light receiving section, the light emitting section irradiating the detection area with light, the light receiving section receiving the light from the detection area and outputting a light sensitive signal indicative of an amount of the received light;
a processor; and
a memory storing machine readable instructions that, when executed by the processor, cause the image forming apparatus to operate as:
a sensor adjustment section configured to adjust a sensitivity of the sensor to a target level by varying a set value of an adjustable characteristic value associated with the sensitivity, the set value of the adjustable characteristic value being adjusted to achieve the target level of the sensitivity based on explorative measurement of the adjustable characteristic value corresponding to a predetermined reference level of the light sensitive signal, the explorative measurement being performed while the detection area is in a predetermined state;
an estimation section configured to obtain a measurement value associated with an amount of a leakage current generated on the light receiving section and to estimate based on the measurement value whether the amount of the leakage current is larger than a reference amount; and
a mitigation section configured to mitigate influence of the leakage current on the explorative measurement, by at least one of adjustment of the light receiving section for reduction of the leakage current and modification of the predetermined reference level, if the estimation section estimates that the amount of the leakage current is larger than the reference amount.

2. The image forming apparatus as in claim 1, wherein the adjustable characteristic value includes at least one of an intensity of light emitted from the light emitting section and a light sensitivity level of the light receiving section.

3. The image forming apparatus as in claim 1, wherein:
the predetermined reference level includes at least a first reference level and a second reference level lower than the first reference level; and
the mitigation section modifies the second reference level so as to mitigate the influence of the leakage current on the explorative measurement.

4. The image forming apparatus as in claim 3, wherein the sensor adjustment section adjusts the set value of the adjustable characteristic value to achieve the target level of the sensitivity, based on a correlation between a measured value of the adjustable characteristic value and a level of the light sensitive signal, which is obtained as a result of the explorative measurement of the adjustable characteristic value corresponding to the first reference level and the second reference level of the light sensitive signal.

5. The image forming apparatus as in claim 1, wherein the estimation section obtains the measurement value associated with the amount of the leakage current, from a measured level of the light sensitive signal.

6. The image forming apparatus as in claim 1, wherein the reference amount for the leakage current is set to vary with change of the predetermined reference level.

7. The image forming apparatus as in claim 6, wherein the mitigation section repeats the at least one of adjustment of the light receiving section and modification of the predetermined reference level until the estimation section estimates that an amount of the leakage current is equal to or smaller than the reference amount.

8. The image forming apparatus as in claim 1, wherein:
the sensor adjustment section performs adjustment of the sensitivity of the sensor when a predetermined condition is satisfied; and
the mitigation section completes the at least one of adjustment of the light receiving section and modification of the predetermined reference level before the predetermined condition is satisfied.

9. The image forming apparatus as in claim 1, wherein the machine readable instructions, when executed by the processor, further cause the image forming apparatus to operate as:
a temperature acquisition section configured to obtain temperature information; and
a correction section configured to modify, based on the temperature information, a result of the at least one of adjustment of the light receiving section and modification of the predetermined reference level.

10. The image forming apparatus as in claim 1, wherein:
the sensor adjustment section obtains at least one measured value of the adjustable characteristic value by repetition of the explorative measurement, and adjusts the set value of the adjustable characteristic value based on the at least one measured value; and
the number of repetitions of the explorative measurement is increased as the predetermined reference level is increased as a result of the modification of the predetermined reference level.

11. The image forming apparatus as in claim 1, wherein:
the light receiving section is arranged to receive the light reflected from the detection area;

the light sensitive signal has a level that increases as an amount of the light reflected from the detection area increases; and the sensor adjustment section performs the explorative measurement while the detection area is occupied by a most highly reflective object having a possibility of being present in the detection area.

12. The image forming apparatus as in claim 1, wherein the target level is modified according to the measurement value associated with the amount of the leakage current.

13. The image forming apparatus as in claim 1, further comprising a belt configured to convey a recording medium during image formation, wherein the detection area is located on a path of the belt.

14. The image forming apparatus as in claim 13, wherein:
a detection pattern to be used for measurement of an error in image formation is formed on the belt during an error correction process; and
the sensor is used to measure the error on the detection pattern.

15. A sensor adjustment method for adjusting a sensitivity of a sensor included in an image forming apparatus to a target level, the sensor being used to detect a state of an object present in a detection area, the sensor having a light emitting section and a light receiving section, the light emitting section irradiating the detection area with light, the light receiving section receiving the light from the detection area and outputting a light sensitive signal indicative of an amount of the received light, the sensor adjustment method comprising:
performing explorative measurement of an adjustable characteristic value corresponding to a predetermined reference level of the light sensitive signal while the detection area is in a predetermined state, the adjustable characteristic value being associated with the sensitivity of the sensor;
adjusting a set value of the adjustable characteristic value based on a result of the explorative measurement so as to achieve the target level of the sensitivity, by a sensor adjustment process;
obtaining a measurement value associated with an amount of a leakage current generated on the light receiving section;
estimating based on the measurement value whether the amount of the leakage current is larger than a reference amount, by an estimation process; and
mitigating influence of the leakage current on the explorative measurement by a mitigation process if an estimation result from the estimation process indicates that the amount of the leakage current is larger than the reference amount, wherein at least one of: adjustment of the light receiving section for reduction of the leakage current, and modification of the predetermined reference level, is performed by the mitigation process for mitigating the influence of the leakage current on the explorative measurement.

16. The sensor adjustment method as in claim 15, wherein:
the predetermined reference level includes at least a first reference level and a second reference level lower than the first reference level; and
the second reference level is modified by the mitigation process for mitigating the influence of the leakage current on the explorative measurement.

17. The sensor adjustment method as in claim 15, wherein the reference amount for the leakage current is set to vary with change of the predetermined reference level.

18. The sensor adjustment method as in claim 17, wherein the at least one of adjustment of the light receiving section and modification of the predetermined reference level is repeated by the mitigation process until an estimation result from the estimation process indicates that an amount of the leakage current is equal to or smaller than the reference amount.

19. The sensor adjustment method as in claim 15, wherein:
at least one measured value of the adjustable characteristic value is obtained by repetition of the explorative measurement, and the set value of the adjustable characteristic value is adjusted based on the at least one measured value by the sensor adjustment process; and
the number of repetitions of the explorative measurement is increased as the predetermined reference level is increased as a result of the modification of the predetermined reference level.

20. A non-transitory computer-readable medium having a sensor adjustment program stored thereon, which is operable to implement a sensor adjustment method on a computer connected to a sensor included in an image forming apparatus, the computer being capable of executing the sensor adjustment program for implementing the sensor adjustment method for adjusting a sensitivity of the sensor to a target level, the sensor being used to detect a state of an object present in a detection area, the sensor having a light emitting section and a light receiving section, the light emitting section irradiating the detection area with light, the light receiving section receiving the light from the detection area and outputting a light sensitive signal indicative of an amount of the received light, the sensor adjustment program comprising:
code for performing explorative measurement of an adjustable characteristic value corresponding to a predetermined reference level of the light sensitive signal while the detection area is in a predetermined state, the adjustable characteristic value being associated with the sensitivity of the sensor;
code for adjusting a set value of the adjustable characteristic value based on a result of the explorative measurement so as to achieve the target level of the sensitivity;
code for obtaining a measurement value associated with an amount of a leakage current generated on the light receiving section;
code for estimating based on the measurement value whether the amount of the leakage current is larger than a reference amount; and
code for mitigating influence of the leakage current on the explorative measurement if the amount of the leakage current is estimated to be larger than the reference amount, wherein at least one of: adjustment of the light receiving section for reduction of the leakage current, and modification of the predetermined reference level, is performed for mitigating the influence of the leakage current on the explorative measurement.

* * * * *

UNITED STATES PATENT AND TRADEMARK OFFICE
CERTIFICATE OF CORRECTION

PATENT NO.         : 8,290,388 B2
APPLICATION NO.    : 12/724805
DATED              : October 16, 2012
INVENTOR(S)        : Kentaro Murayama It is certified that error appears in the above-identified patent and that said Letters Patent is hereby corrected as shown below:

In the Claims

In Column 20, Claim 20, Line 55:
    Please delete "of: adjustment" and insert -- of adjustment --.

In Column 20, Claim 20, Line 56:
    Please delete "current, and" and replace with -- current and --.

In Column 20, Claim 20, Line 57:
    Please delete "level, is" and insert -- level is --.

Signed and Sealed this
Thirteenth Day of August, 2013

Teresa Stanek Rea
*Acting Director of the United States Patent and Trademark Office*